United States Patent [19]

Sovis

[11] Patent Number: 5,100,092
[45] Date of Patent: Mar. 31, 1992

[54] TWO-WAY MANUAL SEAT ADJUSTER WITH FULL MEMORY EASY ENTRY

[75] Inventor: David M. Sovis, Novi, Mich.

[73] Assignee: Hoover Universal, Inc., Plymouth, Mich.

[21] Appl. No.: 708,108

[22] Filed: May 28, 1991

Related U.S. Application Data

[63] Continuation of Ser. No. 488,214, Mar. 5, 1990, abandoned.

[51] Int. Cl.⁵ ............................................. F16M 13/00
[52] U.S. Cl. .................................................... 248/429
[58] Field of Search ............... 248/420, 419, 424, 429, 248/430; 297/341

[56] References Cited

U.S. PATENT DOCUMENTS

| | | | |
|---|---|---|---|
| 3,931,473 | 9/1976 | Nagai | 297/341 X |
| 3,940,182 | 2/1976 | Tamura | 297/341 |
| 4,852,846 | 8/1989 | Weier | 248/430 |
| 4,881,774 | 11/1989 | Bradley | 248/430 X |
| 4,898,356 | 2/1990 | Pipon | 248/429 |

Primary Examiner—David M. Purol
Assistant Examiner—Robert A. Olson
Attorney, Agent, or Firm—Harness, Dickey & Pierce

[57] ABSTRACT

A vehicle seat adjuster with an easy entry mechanism for releasing the seat latch to enable the seat to move forward upon a forward rotation of the seat back from its generally upright position. The easy entry mechanism includes a set position locator on the stationary rail of the seat adjustor to serve as a memory of the adjusted seat position to relatch the seat in its adjusted position upon return of the seat. During manual seat adjustment the set position locator is moved along with the seat assembly.

18 Claims, 4 Drawing Sheets

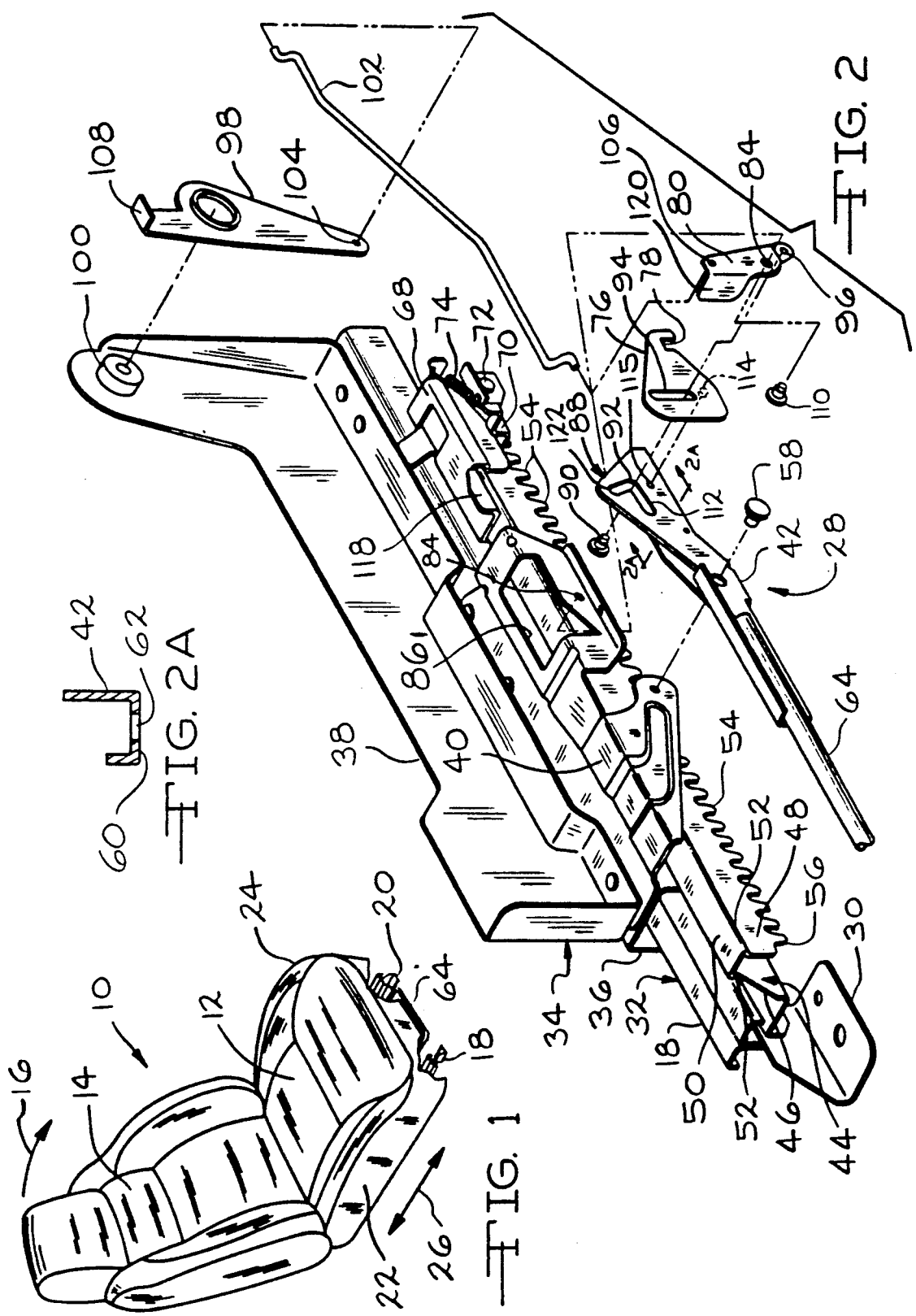

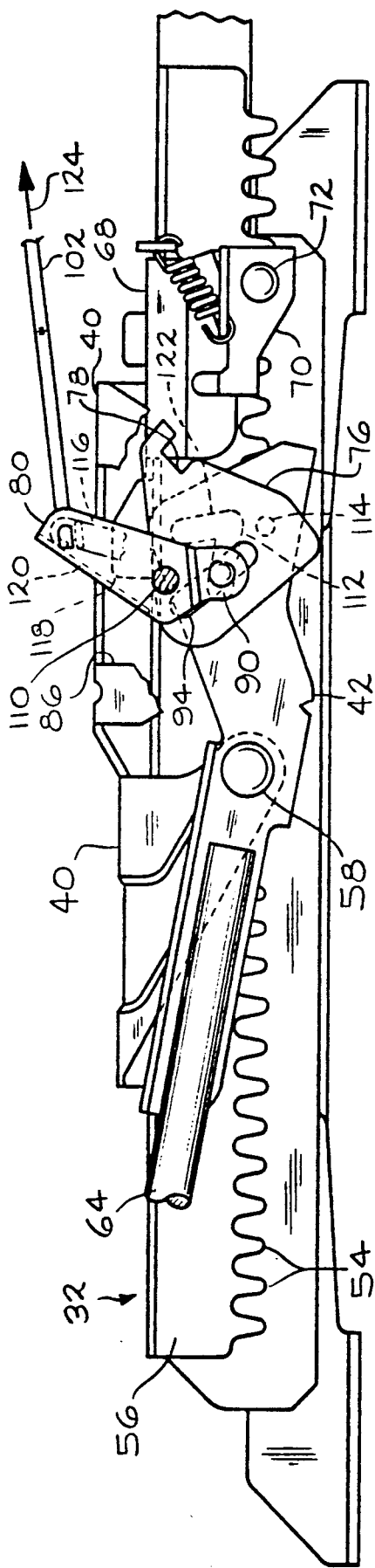
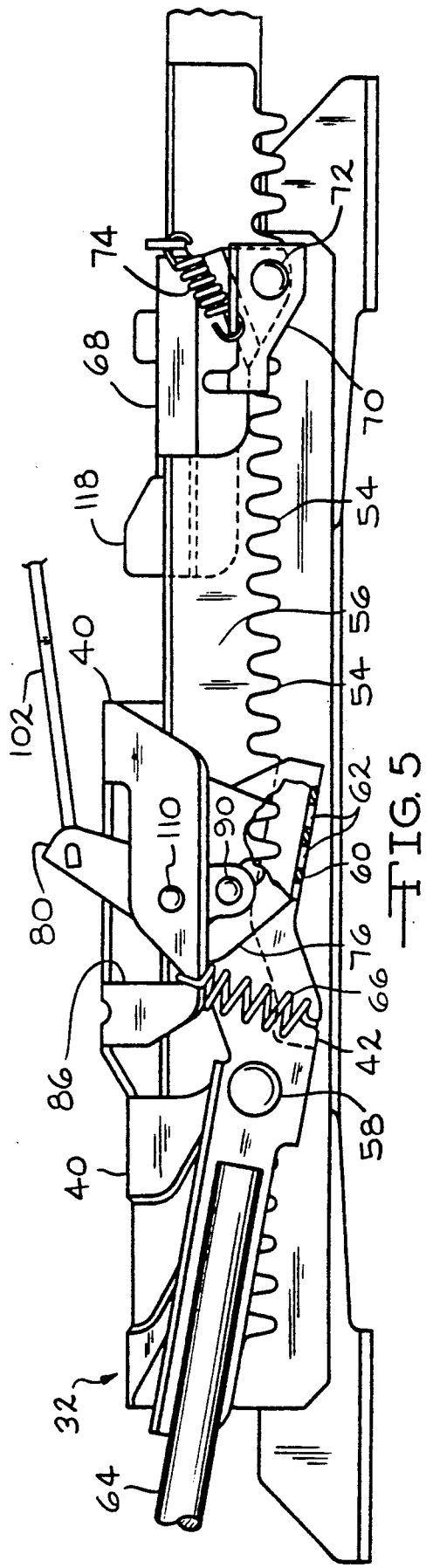

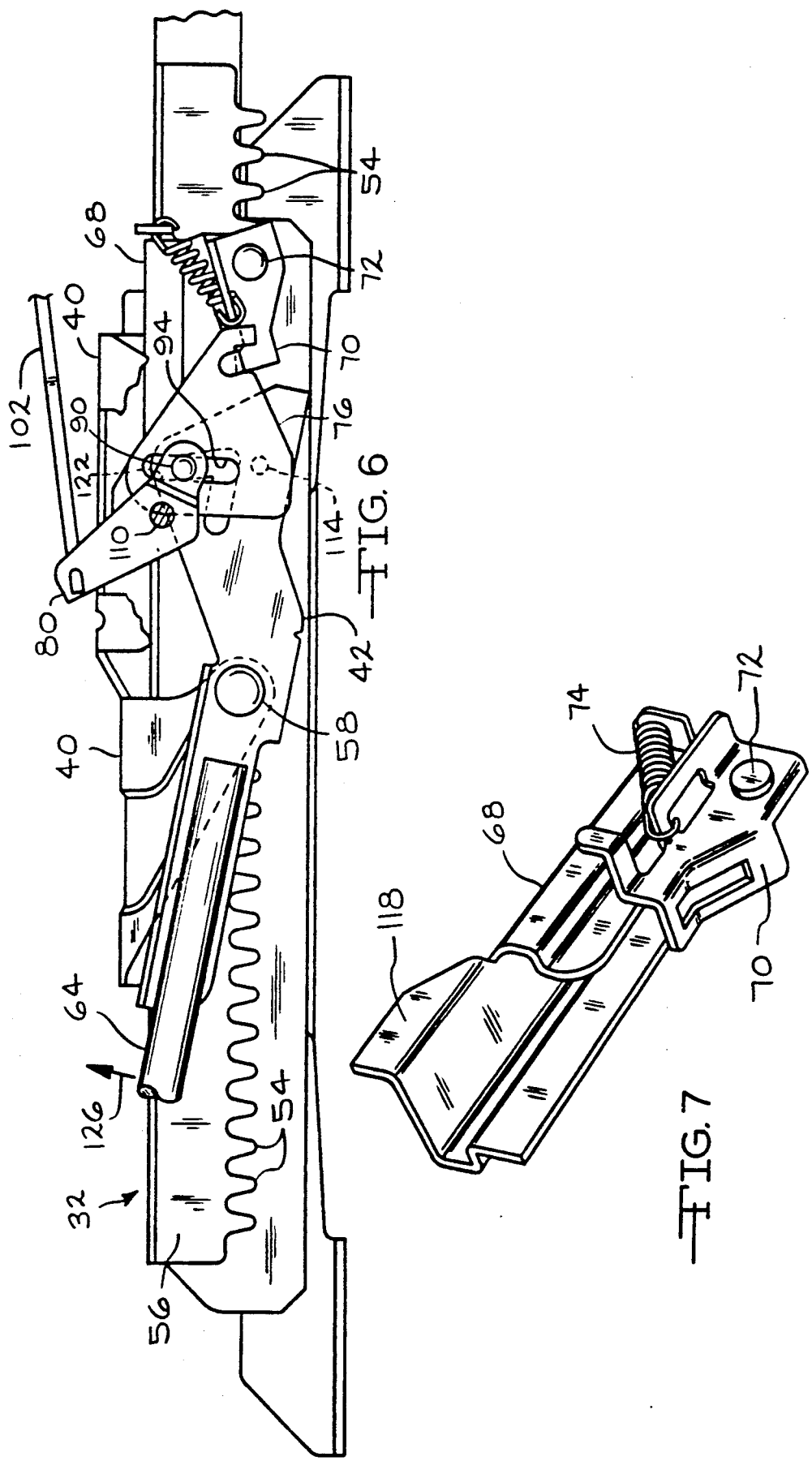

TWO-WAY MANUAL SEAT ADJUSTER WITH FULL MEMORY EASY ENTRY

This is a continuation of U.S. patent application Ser. No. 488,214, filed Mar. 5, 1990, now abandoned.

BACKGROUND OF THE INVENTION

The present invention relates to a vehicle seat assembly having an easy entry mechanism that slides the seat assembly forward to increase the opening to the area behind the seat assembly to ease entry into the rear seat area and, in particular, to an easy entry mechanism with a memory to relatch the seat in its original adjusted position after it is returned from the forward easy entry position.

In many two door motor vehicles the front seats are equipped with an easy entry mechanism to increase the access opening to the rear seat area of the vehicle. The easy entry mechanism operates to automatically release the seat latch when the upright seat back is tilted forward to provide access to the rear seat. Once the seat has been unlatched, the seat is moved forward on its track by a spring or other device to a forward position. When the seat back is returned to its upright position and the seat is moved rearward, the seat will again relatch to lock the seat in position. Many easy entry mechanisms however, relatch the seat in its forwardmost latched position rather than relatching the seat in the adjusted position it was in at the time the seat back was moved forward. The seat occupant is then required to readjust the seat position following each actuation of the easy entry mechanism.

To avoid the need for continuous readjustment of the seat position, seats have been developed with a "memory" of the adjusted position prior to easy entry operation. Several of the memory easy entry systems include an elongated shield moveable along the lower rail of the seat adjuster during manual seat adjustment. The shield locks onto the lower rail during easy entry operation and prohibits engagement of the seat latch with the rail to prevent latching of the seat. After easy entry operation, when the seat latch has been moved rearward past the shield, the latch is allowed to reengage.

Shield type memory devices have numerous disadvantages, the greatest of these being the increased forces required to move the seat forward and rearward during easy entry operation. The latch lever is forced against the shield, which is covering the latch engagement means on the rail. The latch lever thus slides against the shield as the seat is moved forward and rearward until the seat latch reaches the end of the shield and is allowed to reengage with the rail. The sliding of the seat latch against the shield greatly increases the friction between the seat and the rail requiring increased force to move the seat in easy entry operation once it is unlatched. Furthermore, the elongated shield may protrude beyond the edge of the lower rail and can become an obstruction to the occupant's feet and to the manual release handle used by the occupant in adjusting the seat.

Therefore, it is an object of the present invention to provide an easy entry seat adjuster with full memory which eliminates the sliding contact of the seat latch with a shield to reduce the effort needed to move the seat in easy entry operation.

It is an advantage of the present invention that by eliminating the sliding contact between the latch and a shield device, wear of the seat adjuster components is reduced prolonging the useful life of the adjuster.

The seat adjuster of the present invention includes a stationary lower rail mounted to the vehicle floor and a moveable upper rail slidable thereon. Attached to the lower rail is a rack section consisting of a plurality of teeth extending longitudinally of the lower rail. A latch is pivotally mounted to the upper sliding rail and includes a plurality of apertures for receiving the rack teeth. In the latched position, the rack teeth extend through the apertures of the latch to interlock the latch and the rack to hold the seat in position.

A cam lever, also pivotally mounted to the upper rail, is rotated in response to forward rotation of the seat back in easy entry operation. Rotation of the cam lever causes the latch to disengage from the lower rail rack teeth enabling the seat to slide forward. Upon return of the seat back to its normal position and rearward sliding of the seat, a stationary member selectively positioned on the lower rail contacts the cam lever when the seat has returned to its original position. The cam lever is returned to its original position permitting reengagement of the latch to look the seat in its original position.

During easy entry operation, the stationary member remains in place on the rack. When the seat is moved during manual adjustment, the stationary member is moved to a new position along with the seat.

Further objects, features and advantages of the invention will become apparent from a consideration of the following description and the appended claims when taken in connection with the accompanying drawings.

DESCRIPTION OF THE DRAWINGS

FIG. 1 is a perspective view of a vehicle seat assembly having the easy entry seat adjuster with memory of the present invention.

FIG. 2 is a partially exploded perspective view of the easy entry seat adjuster.

FIG. 2A is a sectional view of the latch as seen from substantially the line 2A—2A of FIG. 2.

FIG. 4 is a side elevational view of the easy entry seat adjuster with a portion broken away for clarity illustrating the latch being released in the easy entry mode.

FIG. 5 is a side elevational view of the easy entry seat adjuster with the latch released in the easy entry mode and the seat moved forward.

FIG. 6 is a side elevational view of the easy entry seat adjuster with a portion broken away for clarity illustrating the latch released in the manual seat adjustment mode.

FIG. 7 is a bottom perspective view of the seat position locator.

DETAILED DESCRIPTION OF THE INVENTION

Figure 3:
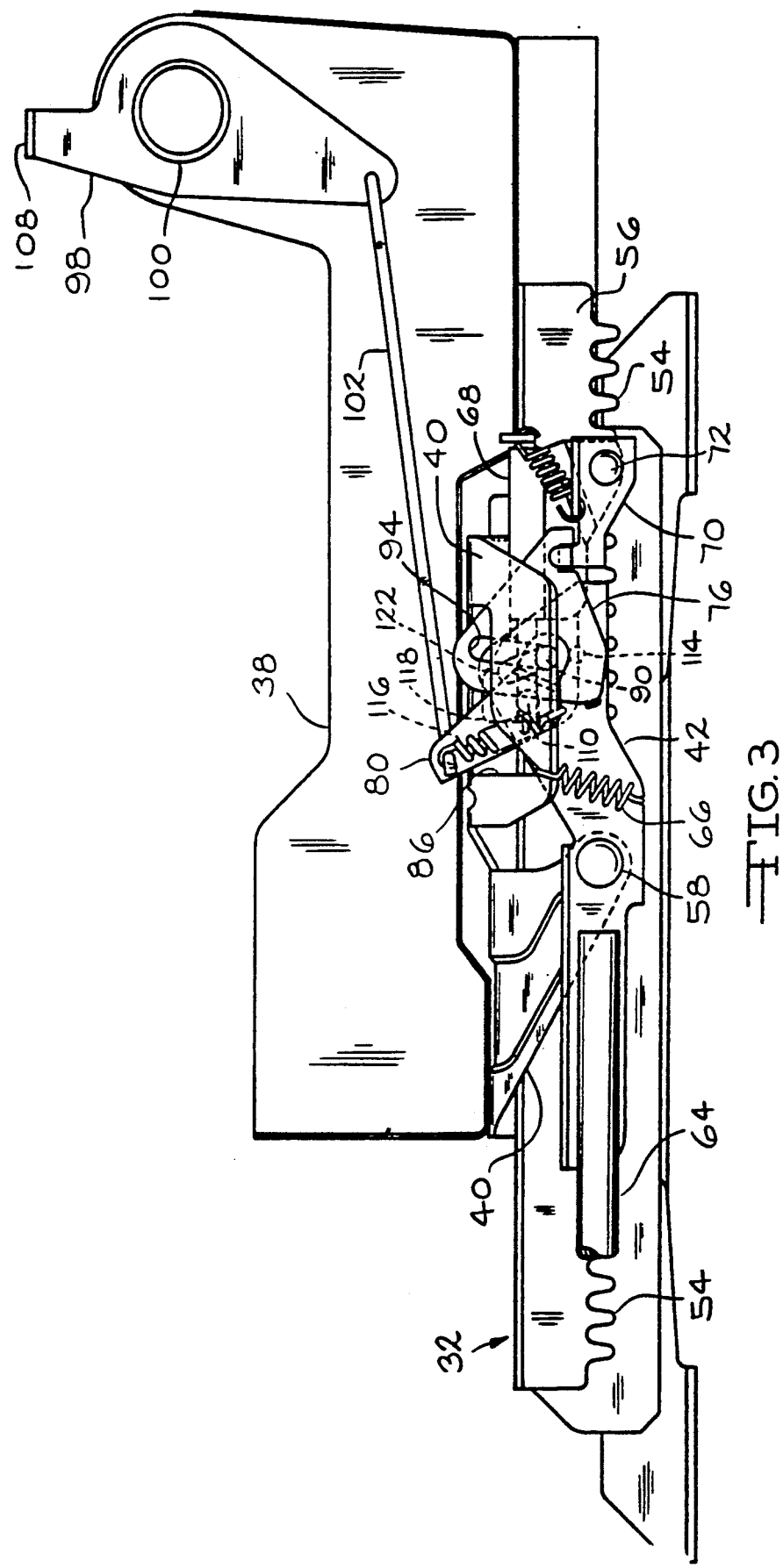
FIG. 3 is a elevational view of the easy entry seat adjuster in the latched position.

Seat assembly 10 shown in FIG. 1 includes the easy entry seat adjuster having full memory according to the present invention. Assembly 10 includes a lower seat cushion 12 and a generally upright seat back 14 extending from the rear of seat cushion 12. A seat with the full memory easy entry mechanism is particularly useful in two-door motor vehicle. Seat back 14 can be dumped, i.e., rotated forward, in the direction of arrow 16 to increase the access opening to the rear seat area of the two door vehicle in which it is installed. Seat assembly 10 is supported on two rails 18 and 20 which run along the lateral sides 22 and 24 respectively of the seat assembly. Rails 18 and 20 are fixed to the vehicle floorpan while the seat cushion 12 and seat back 14 are slidably mounted upon the rails to enable fore and aft adjustment of the position of seat assembly 10 in the direction of double arrow 26.

The seat adjuster 28 of the present invention is shown in FIGS. 2 through 6 and includes the easy entry mechanism. Seat adjuster 28 further provides a memory feature that automatically relatches the seat assembly 10 upon return from the forward easy entry position to its original position.

The right-hand side of the seat adjuster 28 is shown in FIGS. 2 through 6. Rail 18 of the seat adjuster 28 includes a pair of supports 30 for attaching the rail to the floorpan of a motor vehicle. Only the forward support 30 is shown in FIG. 2. Rail 18 includes a support portion 32 upon which is supported the upper rail 34. Upper rail 34 includes a carriage 36 which is slidably supported on the support portion 32 of the stationary rail through a plurality of bearing supports (not shown). Upper rail 34 also includes a riser 38 to which is attached the seatpan of seat cushion 12. Extending in an inboard direction from the upper rail 34 is a latch attaching bracket 40 used to pivotally mount the latch 42 used to hold the seat in place relative to the stationary rail.

Fixed or stationary rail 18 also includes a rack portion 44 having a modified T cross-section shape with two generally vertical legs 46 and 48 and an upper cross piece 50 extending laterally beyond the two vertical legs 46 and 48. A ridge 52 is thus formed on each side of the cross piece 50. The leg 46 is attached to the rail mounting portion 32 while the leg 48 has a number of teeth 54 extending downwardly forming a rack 56.

Latch 42 is pivotally mounted to the latch attaching bracket 40 by pivot pin 58. Latch 42 is shaped as a J in cross-section as shown in FIG. 2A. The lower cross portion 60 of the latch includes a plurality of windows 62 through which rack teeth 54 extend to interlockingly engage latch 42, locking the upper sliding rail in position relative to the lower rail 18.

A generally U-shaped handle 64 is attached at one end to latch 42, crosses along the font of seat assembly 10 and is attached to a second latch on the opposite side of the seat assembly. A seat occupant adjusts the seat position by raising handle 64 causing latch 42 to pivot about pin 58 lowering the cross portion 60 out of engagement with teeth 54. This releases the upper rail 34 allowing the position of the seat to be adjusted in the fore and aft direction as desired by the occupant. Once handle 64 is released, spring 66 returns the latch to the engaged position locking the upper rail in place.

A traveler car 68 is slidably mounted on the rack portion 44 and functions as a set position locator to provide a memory of the seat set position when the seat latch is released for the easy entry operation as will be described below. A pawl 70 is pivotally mounted to the traveler car 68 by pin 72 and is biased into position by spring 74. Pawl 70 engages the teeth 54 of rack 56 to lock the traveler car in position. A cam hook 76 is pivotally mounted to latch 42 and engages the pawl 70 with the hook portion 78. When the seat position is manually adjusted, cam hook 76 moves the pawl 70 out of engagement with the rack teeth so that the traveler car 68 is free to move on track portion 44 as the seat is adjusted. The cam hook pulls or pushes the traveler car to a new position as the seat is moved. When the latch 42 is released, the pawl 70 reengages with the teeth 34 to lock the traveler car in place. When the seat is moved in easy entry operation, the hook 76 disengages from the pawl 70 so that the traveler car 68 remains in position on rack portion 44 as the seat is slid forward.

A lever 80 is mounted to latch bracket 40 through aperture 84 in bracket 40. Lever 80 has three apertures, middle aperture 84 lower aperture 96 and upper aperture 106. The lever 80 is pivotally mounted through middle aperture 84 and extends upwardly through window 86 in the latch bracket 40. Cam hook 76 and the upper portion 88 of latch 42 also extend upward through window 86. A pin 90 extends through the V shaped slot 92 in the latch 42, the straight slot 94 in cam hook 76 and the lower aperture 96 in lever 80. Pin 90 slides through slots 92 and 94 as described below.

A pivot lever 98 is mounted to pivot 100 in the riser 38. A pull rod 102 is connected to the lower end of lever 98 through aperture 104 and to lever 80 through aperture 106. During easy entry operation of the seat, a flange (not shown) on the seat back engages the tab 108 of pivot lever 98 as the seat back rotates forward also about pivot 100. Upon contact with the tab 108, pivot lever 98 rotates counter clockwise as viewed in FIG. 2 creating tension in the pull rod moving the upper portion of lever 80 rearward, i.e., rotating the lever clockwise about pin 110. Clockwise rotation of the lever 80 moves the pin 90 in a forward direction through the generally horizontal portion 112 of slot 92 and also through slot 94 in cam hook 76 causing the cam hook to rotate about its pivot pin 114 aperture 115 in the latch member 42. Rotation of cam hook 76 raises hook portion 78 out of engagement with pawl 70 extending through and also rotates the latch 42 out of engagement with teeth 54. The upper rail 34 is now free to slide forward and is biased in the forward direction by a spring (not shown). In this embodiment, the upper rail 34 slides to the forwardmost adjustable position of the upper rail. A stop, not shown, limits the forward motion of the seat assembly. Alternatively, the seat adjuster could be configured so as to enable the upper rail 34 to slide forward beyond the forwardmost adjustable position during easy entry operation.

Biasing spring 116 is an over center spring that holds lever 80 in either the normal latched position shown in FIG. 3 in which the lever is forward, or the easy entry position shown in FIG. 4 in which the lever is rotated rearward.

When the seat back is returned to its upright position, the seat back disengages from tab 108 of pivot lever 98. The lever 80, held in place by biasing spring 116, holds the pivot lever 98 in its rotated position through push rod 102. When the seat is moved back from the forward easy entry position and reaches its previously adjusted position, the upturned tab 118 of traveler car 68 engages the laterally extending flange 120 of lever 80. This engagement forces lever 80 to rotate counterclockwise to its original position, moving pin 90 rearward through slot 92 returning latch 42 to interlocking engagement with teeth 54 thus relocking the seat in its adjusted position. The hook 76 returns to engagement with pawl 70 of the traveler car.

During manual adjustment of the seat position through handle 64, the latch 42 is rotated clockwise, lowering the rearward portion of the latch containing the slot 92. This also lowers the hook 76 which is mounted to the latch 42. As the latch and hook 76 are lowered, the pin 90 slides upward through the slot 94 in cam hook 76 and through the upper portion 122 of slot 92. The hook 76, by moving generally downwardly, moves the pawl 70 downward out of engagement with teeth 54 enabling the traveler car 68 to slide along track portion 44. When the seat is then moved either forward or rearward along rail 18, the traveler car is moved along with the seat to the new adjusted position. When handle 64 is released, spring 66 returns latch 42 to interlocking engagement with teeth 54 and in so doing raises hook 76 allowing pawl 70 to return to engagement with teeth 54. The traveler car 68 is thus locked into a new position on rack portion 44 corresponding to the new adjusted position of the seat. During subsequent easy entry operation of the seat, the traveler car will remain stationary in its new position serving as a set position locator for the seat position memory.

The movement of the components in the seat adjuster during easy entry operation and during manual adjustment is shown in FIGS. 3-6. With reference to FIG. 3, the seat adjuster is shown in the latched position The upper portion of lever 80 is to the left of its rotational center and held there by spring 116. Cam hook 76 is in a position engaging the pawl 70 of traveler car 68.

In FIG. 4, the seat back has been rotated forward, causing lever 98 to pull rearward on rod 102 as shown by arrow 124. Rod 102 rotates lever 80 to the right of center where it is again held in position by spring 116. The rotation of lever 80 causes pin 90 at the lever end of the lever to move to the left in FIG. 4. In doing so, pin 90 moves through portion 112 of slot 92 in latch 42 causing the latch to rotate clockwise about pivot 58, out of engagement with teeth 54. Pin 90 also moves upward through slot 94 in cam hook 76 causing the hook to rotate counterclockwise about its pivot pin 114 and out of engagement with pawl 70. The seat is now able to move forward and provide increased access to the area behind the seat. The surfaces of slots 92 and 94 thus serve as cam surfaces along which the pin 90 moves to move the latch and cam hook.

FIG. 5 shows the seat moved forward, away from the traveler car 68. The adjusted components maintain the position shown in FIG. 5 even after the seat back is returned to its upright position. When the seat assembly is subsequently moved rearward, the tab 118 of the traveler car will engage flange 120 of lever 80, rotating lever 80 back to its position shown in FIG. 3. This returns the latch to the latched position.

Manual operation of the adjuster is shown in FIG. 6. The latch member is released by upward movement of handle 64 as shown by arrow 126. This rotates the latch 42 clockwise about pivot 58, but the lever 80 is not moved, so that pin 90 travels upwardly through portion 122 of slot 92. Cam lever 76 does not rotate but instead moves down along with the latch, moving pawl 70 out of engagement with teeth 54. As the seat is moved, the traveler car 68 will now move with the seat to the new position. Upon release of handle 64, the components return to their positions in FIG. 3 in which the seat is locked in position as well as the traveler car.

During easy entry operation, the lever 80 holds the latch in a position out of engagement with the rack teeth 54 and also holds the cam hook 76 in a position disengaged from the traveler car pawl 70. In so doing, the seat is unlatched, allowing the seat to move forward and the traveler car 68 is allowed to remain stationary on the lower rail 18 serving as a memory device of the seat position before easy entry operation. The lever 80 used to hold the latch out of engagement with the teeth 54 is carried by the upper rail along with the latch 42 during seat movement. As a result, there is no sliding contact between the latch 42 and the means, i.e. lever 80, used to keep the latch out of engagement with the teeth as the seat moves during easy entry operation. This overcomes the primary disadvantage in many previous easy entry memory seat adjusters, the sliding contact of the latch on a shield. As a result, the efforts required to move the seat fore and aft in easy entry operation are significantly reduced as is wear of the components.

It is understood that the invention is not limited to the exact construction illustrated and described above, but that various changes and modifications may be made without departing from the spirit and scope of the invention as defined in the following claims.

I claim:

1. A vehicle seat assembly comprising:
   a stationary rail for mounting said seat assembly to a vehicle;
   a sliding rail slidably mounted on said stationary rail;
   a lower seat cushion mounted to said sliding rail;
   a seat back extending in a generally upright operative position from the rear of said lower seat cushion, said seat back being mounted for pivotal movement from said upright operative position to a forwardly rotated easy entry position;
   a latch member carried by said sliding rail and moveable between a latched position engaged with said stationary rail and an unlatched position disengaged from said stationary rail, said latch member when in the latched position preventing relative motion between said stationary and sliding rails; and
   means carried by said sliding rail for moving said latch member to said unlatched position ion response to rotation of said seat back to said easy entry position to enable said sliding rail to move forward relative to said stationary rail, and for holding said latch member in said unlatched position until said seat back has been returned to said upright operative position and said sliding rail has been returned to the position of said sliding rail before rotation of said seat back to said easy entry position.

2. The seat assembly of claim 1 further comprising set position locator means on said stationary rail for enabling said latch member to move to said latched position upon return of said sliding rail to the position of said sliding rail before rotation of said seat back to said easy entry position and return of said seat back to said operative position.

3. The seat assembly of claim 2 further comprising:
   manually operated means for moving said latch member from said latched position to enable manual adjustment of said sliding rail relative to said stationary rail; and
   means for moving said set position locator means when said sliding rail is manually adjusted.

4. The seat assembly of claim 3 wherein said stationary rail includes a rack portion with a plurality of teeth, said latch member engaging a portion of said teeth in the latched position; and
   said set portion locator means including a set position locator carried by said rack portion and a pawl member movably mounted on said set portions locator and biased into a position engaging at least one of said teeth to hold said locator in place.

5. An adjuster mechanism for adjusting the position of a vehicle seat assembly, said seat assembly having a seat back that is rotatable from a generally upright operative position to a forward easy entry position, said adjuster mechanism compirsing:

a stationary member;

a movable member mounted to said stationary member and slidable thereon to adjust the position to said movable member relative to said stationary member;

latch means associated with said stationary and movable members for locking said members in position relative to one another, said latch means including a latch mounted to one of said stationary or movable members and latch engaging means on the other of said stationary or movable members for locking engagement with said latch, said latch being movable between a latched position engaging said engagement means and a release position out of engagement with said engagement means, said latch being biased into said latched position;

manually actuated means for moving said latch to said release position for manual adjustment of said seat position;

automatic latch release means carried by said member to which said latch is mounted and operatively coupled to said seat back for moving said latch to said release position in response to rotation of said seat back to said easy entry position and for holding said latch in said release position to enable said seat assembly to move to a forward position until said seat back has been returned to said upright operative position and said seat assembly is moved rearward to the original latched position of said seat assembly before rotation of said seat back to said easy entry position; and means for returning said latch to said latched position in response to rearward movement of said seat assembly to the original latched position of said seat assembly before rotation of said seat back into said easy entry position and return of said seat back to said upright operative position.

6. The adjuster of claim 5 wherein said automatic latch release means includes a cam pin movable along a cam surface of said latch to move said latch to said release position.

7. The adjuster of claim 6 wherein said automatic latch release means includes a cam lever carrying said cam pin, said cam lever being pivotally mounted to said seat assembly and coupled to said seat back so as to rotate from a normal position in response to rotation of said seat back to said easy entry position moving said cam pin along said cam surface of said latch whereby said latch is moved to said release position.

8. The adjuster of claim 7 wherein said returning means includes a set position locator positionable on said other of said stationary and movable members comprising means engageable with said cam lever upon return of said seat assembly to said original position to return said cam lever to its normal position whereby said cam pin returns along said cam surface of said latch to enable said latch to return to the latched position.

9. The adjuster of claim 7 wherein said latch and said cam lever are mounted to said movable member.

10. The adjuster of claim 9 wherein said returning means includes a set position locator positionable on said stationary member comprising means engageable with said cam lever upon return of said seat assembly to the original position of said seat assembly to return said cam lever to the normal position of said cam lever whereby said cam pin returns along said cam surface of said latch to enable said latch to return to the latched position.

11. The adjuster of claim 10 wherein said set position locator includes pawl means for engagement with said engagement means to hold said set position locator in place on said stationary member, said pawl means being movable to a disengaged position to enable said locator to be moved when said seat assembly position is manually adjusted.

12. The adjuster of claim 11 further comprising means operable in response to manual disengagement of said latch for disengaging said pawl means and for moving said locator as said seat assembly position is manually adjusted.

13. The adjuster of claim 12 wherein said disengaging means includes a cam hook coupled to said latch and having the cam surface against which said cam pin moves as said latch is moved.

14. A vehicle seat assembly comprising:

a lower rail for mounting said seat assembly to a vehicle;

an upper rail slidably mounted upon said lower rail;

a lower seat cushion mounted to said upper rail;

a seat back extending in a generally upright position at the rear of said seat cushion, said seat back being mounted for pivotal movement from said upright position to a forwardly rotated easy entry position;

a latch carried by said upper rail and movable between a latched position and a released position;

engagement means associated with said latch and said lower rail for locking said upper rail in position when said latch is in the latched position;

means for biasing said latch into the latched position;

manual release means for moving said latch to said released position to enable manual adjustment of the fore and aft position of said seat cushion and seat back;

automatic means carried by said upper rail for moving said latch to said released position in response to rotation of said seat back to said easy entry position to enable said seat cushion and seat back to be moved forward and for holding said latch in said released position until said seat back is returned to said upright position and said seat cushion and seat back are moved rearward to the positions of said seat cushion and seat back before rotation of said seat back to said easy entry position; and set position locator means movable mounted on said lower rail for enabling movement of said latch back to said latched position after said seat back is returned to said upright position and said seat cushion and seat back are moved rearwardly to their original positions before forward rotation of said seat back.

15. The seat assembly of claim 14 wherein said automatic means includes a lever pivotally mounted to said upper rail and rotatable in response to rotation of said seat back to said easy entry position; and a cam pin carried by said lever and movable along a cam surface of said latch as said lever is rotated to move said latch to said release position.

16. The seat assembly of claim 15 further comprising means for coupling said upper rail to said set position locator means to move said set position locator means with said upper rail when said latch is moved to the released position by said manual release means.

17. The seat assembly of claim 16 wherein said coupling means includes a hook member pivotally mounted to said latch and engaging said set position locator means for moving said locator means, said hook member having a second cam surface engaged by said cam pin and which said cam pin moves along to rotate said hook member away from said locator means when said latch is moved to said released position by said automatic means.

18. An adjuster mechanism for adjusting the position of a vehicle seat assembly, said seat assembly having a seat back that is rotatable from a generally upright operative position to a forward easy entry position, said adjuster mechanism comprising:

a fixed member;

a movable member mounted to said fixed member and movable thereon to adjust the position of said movable member relative to said fixed member;

latch means associated with said fixed and movable members for locking said movable member in position relative to said fixed member, said latch means including a latch mounted to one of said fixed or movable members and latch engaging means on the other of said fixed or movable members for locking engagement with said latch, said latch being movable between a latched position engaging said engagement means and a release position out of engagement with said engagement means;

bias means for holding said latch in said latched position;

manually actuated release mans for moving said latch to said release position for manual adjustment of said movable member relative to said fixed member;

automatically actuated release means for moving said latch to said release position in response to rotation of said seat back to said easy entry position to enable said movable member to move relative to said fixed member;

means engageable with said latch for holding said latch in said release position, said holding means being stationary relative to said latch as said movable member is moved relative to said fixed member; and means for disengaging said holding means from said latch upon rotation of said seat back to said upright position and return of said movable member to the original position of said movable member before rotation of said seat back to said easy entry position whereby said bias means returns said latch to said latched position.

* * * * *

UNITED STATES PATENT AND TRADEMARK OFFICE
CERTIFICATE OF CORRECTION

PATENT NO. : 5,100,092

DATED : March 31, 1992

INVENTOR(S) : David M. Sovis

It is certified that error appears in the above-identified patent and that said Letters Patent is hereby corrected as shown below:

Column 6, line 34, claim 1, "ion" should read --in--.

Column 6, line 62, claim 4, "portion" should read --position--.

Column 6, line 64, claim 4, "portions" should read --positions--.

Column 7, line 6, claim 5, "to" should read --of--.

Column 8, line 18, claim 13, delete "the" and insert in place thereof --a second--.

Column 10, line 5, claim 18, delete "mans" and insert --means--.

Signed and Sealed this

Seventeenth Day of August, 1993

Attest:

BRUCE LEHMAN

*Attesting Officer*

*Commissioner of Patents and Trademarks*